United States Patent [19]

Lalwani

[11] Patent Number: 4,755,545
[45] Date of Patent: Jul. 5, 1988

[54] ROOFING ADHESIVE

[75] Inventor: Steven S. Lalwani, Upper Montclair, N.J.

[73] Assignee: GAF Corporation, Wayne, N.J.

[21] Appl. No.: 34,239

[22] Filed: Apr. 6, 1987

[51] Int. Cl.$^4$ ............ C08L 95/00; C08L 53/02; B32B 11/02; B32B 27/32
[52] U.S. Cl. ............................ 524/64; 524/62; 524/68
[58] Field of Search .................. 524/62, 64, 68

[56] References Cited

U.S. PATENT DOCUMENTS

| | | | |
|---|---|---|---|
| 4,430,465 | 2/1984 | Abbott | 524/68 |
| 4,459,157 | 7/1984 | Koons | 524/62 |
| 4,460,723 | 7/1984 | Rollmann | 524/68 |
| 4,485,201 | 11/1984 | Davis | 524/68 |
| 4,490,493 | 12/1984 | Mikols | 524/68 |
| 4,530,652 | 7/1985 | Buck et al. | 524/68 |
| 4,547,399 | 10/1985 | Fujihara et al. | 524/62 |

*Primary Examiner*—Herbert J. Lilling
*Attorney, Agent, or Firm*—Marilyn J. Maue; Joshua J. Ward

[57] ABSTRACT

A low temperature self-sealing roofing adhesive blend comprising (a) 50-95% by weight of a bituminous component having an asphalt component Index (ACI) less than 0.26 and an asphaltene content less than 20% which component is a road paving asphalt or a blend of road paving asphalt and a hard resin asphalt combined in a weight ratio of between about 1:2 and about 5:1;

(b) 1-6% by weight of a thermoplastic block polymer of styrene and butadiene monomers consisting essntially of between 0% and 90% of the styrene/butadiene diblock polymer having a Brookfield viscosity (25 wt. % toluene solution) at 77° F. of between about 500 and about 5,000 cps and between 100% and 10% of the styrene/butadiene/styrene triblock polymer having a Brookfield viscosity (25 wt. % toluene solution) at 77° F. of between about 1,000 and about 50,000 cps and (c) 4-40% by weight of an inert filler.

The invention also pertains to the use of the above blend as a roofing self-sealing adhesive.

14 Claims, 1 Drawing Sheet

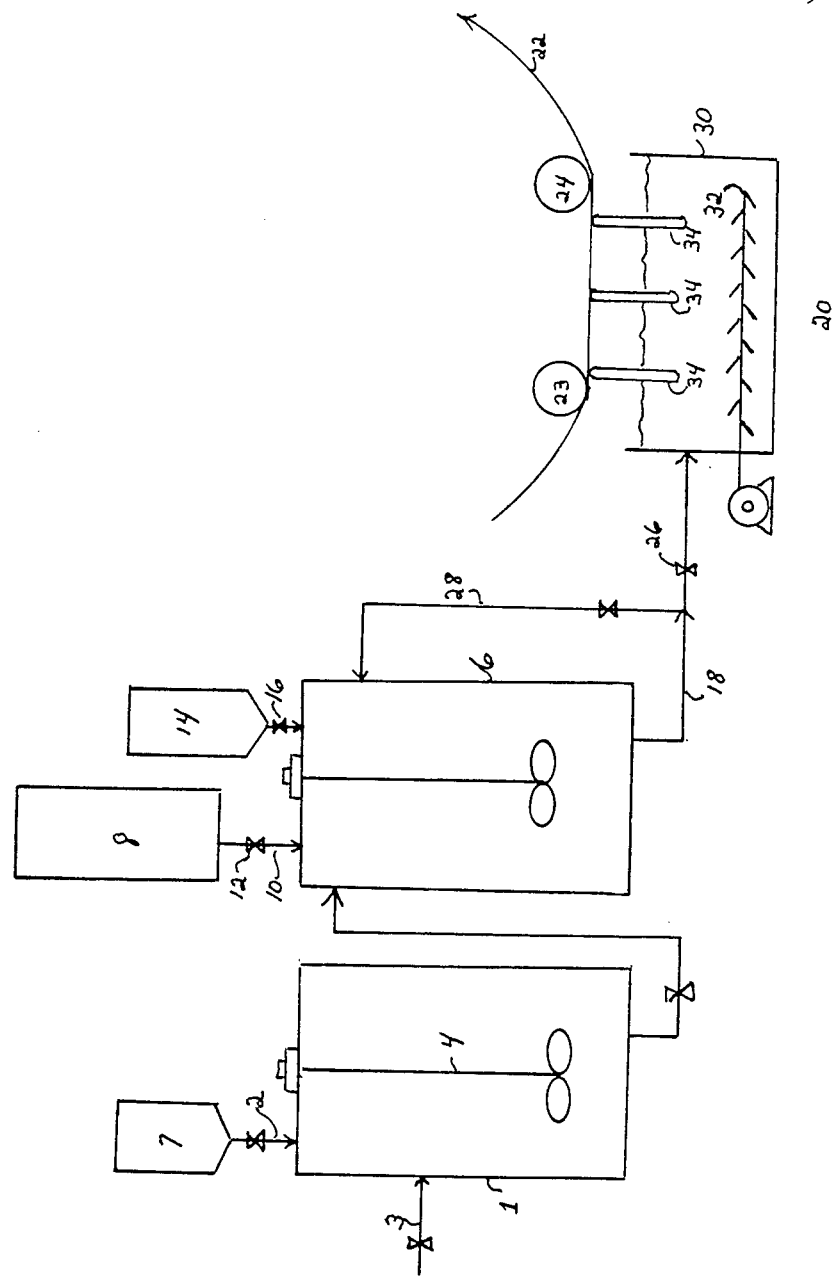

ROOFING ADHESIVE

In one aspect this invention relates to a novel blend of bituminous and synthetic rubber components to produce a low temperature sealing adhesive.

In another aspect the invention relates to the process for self-sealing roofing shingles or roofing strips having the above blend disposed in discrete areas on a surface of said shingle or strip.

Many blends of bituminous material have been proposed which meet certain specifications but which are lacking in others, particularly specifications for roofing adhesives. Among the requirements for a self-sealing adhesive are resistance to crush when the shingles are packed in stacks for shipment, a relatively low melting temperature to permit self-sealing without the application of heating equipment and a strong bond between the joined surfaces which has high wind resistance and good low temperature stability. Other important considerations include good resistance to photo-oxidation; in particular, the ability to retain adhesive properties after exposure of the adhesive to sunlight for more than 2 hours. While certain of these characteristics are found in conventional blends, a combination of all of the above mentioned properties has not been attained.

For example, U.S. Pat. No. 3,978,014 describes blends having high aromaticity and at least 8% rubber content. While these blends exhibit good thermal stability, their self-sealing properties are relatively poor. Also, because of their high aromaticity, these blends are readily degraded by exposure to UV light during roof installation. U.S. Pat. No. 4,559,267 also discloses roofing adhesive blends. However, these include substantial amounts of bitumen roofers flux in their composition which produces a tacky sealant leading to rider granule problems and packaging difficulties as exemplified by low squash resistance and premature adhesion of shingles when shipped in bundles and during installation.

Accordingly, it is an object of this invention to provide a self-sealing adhesive having, in combination, the above desired properties.

Another object of this invention is to provide a commercially feasible and economical process for the use of such self-sealing compositions.

Still another object is to provide a low temperature sealant which has high wind resistance.

These and other objects of the invention will become apparent from the following description and disclosure.

According to this invention there is provided a low temperature self-sealing adhesive blend which comprises:

(a) 50–95% by weight of a bituminous component comprising a road paving grade asphalt or a blend of road paving grade asphalt and a hard resin asphalt in a weight ratio of between about 1:10 and about 10:1; said bituminous component having an asphalt component index (ACI) less than 0.26 and an asphaltene content less than 20%;

(b) 1–6% by weight of a thermoplastic styrene/-butadiene block copolymer wherein the weight ratio of styrene to butadiene is between about 1:1 and about 1:10 and (c) 4–40% by weight of an inert filler.

The ACI of the bituminous component is expressed by the equation $$ACI = Ar - 0.004\, AP$$

wherein Ar is the aromatic carbon portion of the maltene phase and Ap is the % asphaltene. In the present composition, the bituminous component must have an ACI less than 0.26 or, as expressed in terms of aromaticity, less than $0.26 + 0.004\, AP$. It is also essential that the bituminous component have an asphaltene content less than 20%. Within these critical parameters, preferred bituminous components which satisfy the needs of the present invention include 100% road paving grade asphalt and blends of this asphalt with a hard resin asphalt in a weight ratio of between about 1:2 and about 5:1.

The road paving asphalt of the present invention should meet ASTM D3381-81, Table 2 specifications. These bitumens have a penetration at 77° F. between about 40 and 80 dmm (decimillimeters)* and a softening point of between about 110° F. and about 130° F. The viscosity of these materials falls within the range of 1,000 and 5,000 poise, preferably 1,300 to 2,500 poise.* Of these paving asphalts, those which have a penetration at 77° F. of between about 50 and about 70 are most preferred.

\* as per ASTM D 5-83
\*\* as per ASTM D 36-84
\*\*\* as per ASTM D 2171

The hard resin asphalt of the bituminous component, when employed in the blend, can be described as a propane cut bitumen whose properties include penetration at 130° F. (50 g. in 5 seconds) of 30 to 60; a softening point of between about 165° F. and about 195° F., preferably between about 175° F. and about 190° F., and an asphaltene content less than 30%.

The aromaticity of the bituminous component (a) is critical for the reason that, at higher aromatic content, the UV resistance of the adhesive falls below acceptable limits and the adhesive exhibits poor sealability as is established by following data.

A third critical factor in obtaining the improved blends of the present invention involves the use of a thermoplastic block polymer in an amount not exceeding 6% of the total composition. When more than 6% of the rubber component (b) is employed, poor adhesion to the substrate surfaces results and lowered wind resistance, e.g. 30 miles per hour, causes many failures. These disadvantages are evidenced irrespective of the proportions of diblock and triblock copolymer formulated. Generally, component (b) employs between 100% and about 10% by weight of the triblock styrene-butadiene-styrene copolymer having a Brookfield viscosity (25 wt. % toluene solution) at 77° F. between about 1,000 and about 50,000 cps and between 0% and about 90% by weight of the diblock styrene-butadiene copolymer, having a Brookfield viscosity (25 wt. % toluene solution) at 77° F. between about 500 and about 5,000 cps.

It is important to avoid substitution of monomers other than styrene and butadiene in the copolymer since the introduction of other polymeric components such as polyisoprene and polyethylene or ethylene-vinyl acetate copolymers either do not give adequate sealability at temperatures less than 70° F. or diminish the resistance to flow of the composition after application and lower resiliency and squash resistance when applied to roofing materials which are packed in bundles or otherwise assembled for shipment. Additionally, some of these copolymers add tack to the overall composition and are thus associated with rider granule problems in which loose granules adhere to the soft tacky surface of the adhesive composition and mask or diminish adhesive properties by reducing the adhesive surface area. The present blend which is significantly harder, retains fewer granules on its adhesive surface and thus achieves stronger adhesion per surface area.

The filler employed in the above blend can be any of those conventionally used. These include stone dust, limestone, ground glass fibers to add strength, wollastonite, sand, talc, mica, vermiculite, carbon black and titanium dioxide which possess antioxidant and UV resistance properties as well as adding strength to the blended material.

Although not required, the present composition may also contain a small amount of antioxidant, such as a stearically hindered phenolic compound having a linear, branched or radial molecular structure. When used, these compounds are required to have a high decomposition temperature, e.g. greater than 400° F., to withstand mixing temperatures employed in the preparation of the blend. Preferred antioxidants which may be incorporated are those having a decomposition temperature and volatile loss temperature greater than 400° F. Typical species include IRGANOX 1010 supplied by Ciba-Geigy, i.e. tetrakis [methylene(3,5-di-tert-butyl-4-hydroxyhydrocinnamate)] methane which has a radial structure and an empirical formula of $C_{72}H_{108}O_{12}$, the antioxidants covered in U.S. Pat. Nos. 3,285,855 and 3,644,482, AGERITE GT (an isocyanurate based hindered phenol supplied by R. T. Vanderbilt), and the like. When included in the formulation, e.g. in cases where a small amount of filler, e.g., less than 10%, is used, the antioxidants may comprise between about 0.05 and about 5% by weight, preferably not more than about 3% by weight of the total composition.

The blends of the present invention are prepared by several convenient and economical methods. In general, the block polymer of rubber component (b), in the form of a powder or chunks is added to the liquid road paving asphalt which swells and softens the rubber particles to their flow point. Intimate mixture of the composition, including filler, provides a uniformly viscous material suitable as an adhesive. These products seal at low temperature to provide a strong bond between units of a roofing or siding material which resist failure at high wind velocities. More specifically, according to one method of preparation, the components of (a) are mixed for a period of from 0.1 to 5 hours at a temperature of between about 300° F. and about 450° F. until a uniform distribution of the asphalts is obtained. Component (b) is then added and mixed at about the same temperature for about the same period. Finally filler is added and thoroughly mixed therein at a temperature within the same range.

An alternative to the above process entails mixing the paving grade asphalt of component (a), and component (b) at a suitable temperature between about 250° F. and 450° F., preferably between about 300° and 400° F. for a period of from about 0.25 to about 10 hours until a uniform mixture is formed and then adding the hard resin asphalt and filler with thorough mixing at a temperature within the above range.

The later method can employ somewhat lower temperatures in the initial mixing step since the hard resin asphalt, in which the rubber is insoluble, is not present. Most preferred mixing temperatures for the preparation of the present blends, however, fall within the range of from about 325° F. and about 375° F. and usually a mixing time of from about 0.75 to about 3 hours is adequate to achieve a uniform composition. Even lower mixing time, e.g. 0.5 hour, and low temperatures, e.g. up to 250° F., can be employed when high shear mixers are employed.

The present blends are applied to a roofing element such as a shingle or roofing sheet in the form of an adhesive strip or bead or in a pattern of beads or other configuration along an area which is to be contacted with a second roofing element, e.g. on the under surface or over surface of the roofing material where overlap or underlap of succeeding shingles or strips occur. The same application can be effected to seal siding shingles or sheets. More specifically, the shingle material is passed over or under an applicator containing the present blend at a temperature of from about 250° F. to about 400° F.

The applicator can be a set of print wheels or an extruder capable of applying adhesive in beads of consistent size or as a continuous ribbon on a surface of the material to be joined and sealed to another member. After affixing the adhesive in the desired area or areas, the adhesive is quenched with water, air cooled or cooled by contact with any other suitable quenching media, e.g. a dilute ethylene glycol aqueous solution.

Generally the material on which adhesive is applied is cut to size after application, however, it is also within the scope of this invention to precut shingles or sheets which may be subsequently presented to the applicator for adhesive application.

A preferred embodiment of the process of manufacturing the self-seal adhesive of this invention and applying same to a roofing shingle is illustrated by FIG. 1.

FIG. 1 is a flow diagram describing a particular arrangement of processing vessels employed in the manufacture of the present adhesive. In the drawing, vessel 1 is a pre-mix concentrate tank equipped with a mechanical stirrer for premixing and dissolving a block styrene-butadiene copolymer powder, introduced through line 2 from reservoir 7, into road paving grade asphalt which is introduced into vessel 1 from valved line 3. Tank 1 is maintained at about 350° F. and is continuously agitated by mechanically driven stirrer 4 to provide a uniform mixture containing the total amount of road paving grade asphalt and block polymer to be used in the composition. The uniformly mixed concentrate is then withdrawn from tank 1 and introduced into mechanically stirred formulating tank 6 through valve line 5. Tank 6 may contain a plurality of mixing blades to provide more rapid and intimate mixing of the contents. In cases where hard resin asphalt is included in the composition, said material is fed to tank 6 from hard asphalt reservoir 8 through valved line 10. The amount of hard resin asphalt can be adapted to satisfy varied composition requirements by regulating flow through valve 12 on line 10 in response to the amount of hard resin desired for a particular composition. Filler material from filler hopper 14 is finally introduced into the upper portion of tank 6 from metering valved line 16. In tank 6, the entire composition is intimately and uniformly mixed at a temperature of about 350° F. and the desired composition is drawn off through line 18 from which at least a portion is passed to applicator device 20. Applicator 20 is described as an adhesive supply tank 30 equipped with a longitudinally disposed motor driven adhesive mixing rod 32 employed to maintain a homogeneous mixture. A plurality of revolving sprocketed print wheels 34 are partially submerged below the level of liquid adhesive supplied to tank 30 from valved line 26. As shown, the tank is situated beneath the under surface of shingle sheet 22 which is passed over tank 30 by means of rollers 23 and 24. The under surface of the shingle sheet is adapted to engage the wetted tips of sprockets of revolving print wheels 34 which pick-up adhesive from tank 30 and transfer adhesive in a pattern of dots to the under surface of sheet 22. Valved 26 is regulated to maintain a desired liquid level of adhesive in tank 30 and to bleed-off excess through valved line 28 which recycles excess adhesive to formulating tank 6 as makeup supply.

The above arrangement provides operational flexibility in the proportions of bituminous mixture required in a product to meet certain specific needs. Thus, various types of roofing material, indicated by 22 requiring different asphalt blends, can be changed during operation without interrupting the overall production of adhesive.

Another technical advantage achieved by the above arrangement is the reduction in mixing time required to dissolve the rubber component which is soluble in the road paving asphalt but substantially insoluble in hard resin asphalt.

Having thus generally described the present invention reference is now had to the accompanying examples which illustrate preferred embodiments thereof but which are not to be construed as limiting to the scope of the invention as more broadly set forth above and in the appended claims.

In all of the following examples the asphalts used are of the following types:

(1) AC-20 Paving grade asphalt having an aromatic portion in the maltene phase of about 24% and an asphaltene content of about 12% and (2) Petroleum Hard Resin having an aromatic portion in the maltene phase of about 40% and an asphaltene content of about 25%.

EXAMPLE 1

Preparation of Low Temperature Self-Sealing Adhesive

Seventy eight parts by weight of a bituminous mixture of 39% by weight paving asphalt AC-20 (softening point of 120° F.) and 39% by weight of hard asphalt petroleum resin (softening point of 186° F.) was made by blending these components at 350° F. The resulting blend had an ACI value of 0.246 and an asphaltene content of 18.5%.

A 5:1 mixture of styrene-butadiene diblock copolymer to styrene-butadiene-styrene triblock copolymer was separately prepared and 6 parts by weight gradually added to the bituminous mixture and blended therein at 350° F. over a mixing time of 3 hours. To the resulting uniform mixture of bitumen and dissolved rubber was then added 16 parts by weight of finely ground limestone filler which was uniformly mixed therein over a period of 0.5 hours. The resulting adhesive composition had a viscosity of 1500 cps at 350° F. The composition of this example is summarized as

|  | Wt. % |
| --- | --- |
| Road asphalt AC-20 | 39 |
| Hard asphalt | 39 |
| Diblock rubber | 5 |
| Triblock rubber | 1 |
| Filler, limestone | 16 |

A portion of the above composition (sample a) was then subjected to a peel strength test which comprises affixing a 0.03 inch thick bead of 0.5×1 inch dimension on a 3.75×5.25 inch roofing shingle, then placing a 2×5.25 inch strip of roofing shingle over said bead and placing the composite in an oven for 16 hours at 75° F. This peel strength test was repeated on an equal portion (Sample b) of the above composition except that oven heating was effected at 90° F. Finally the peel strength test was again repeated on another equal portion (Sample c) of the above composition except that oven heating was conducted at 116° F.

After heating for 16 hours, the samples were cooled to 75° F. and the pounds of force exerted to pull the strip away from the shingle in each composite was recorded as the Peel Strength. The results of these tests are reported in Table I.

TABLE I

| Shingle Temperature | Peel Strength (lbs.) |
| --- | --- |
| Sample (a) 75° F. | 1.5 |
| Sample (b) 90° F. | 4.5 |
| Sample (c) 116° F. | 15.0 |

Generally, the shingle temperature is about 40° F. above ambient temperature on a sunny day. Thus, the peel strength of sample (a) is 1.5 pounds at about 35° F. ambient temperature.

In another test, 12 beads of the above adhesive in a 0.03 inch thickness of 0.5×1 inch dimension were applied to a roofing shingle and showed excellent resistance to squash under a 50 lb. load at 100° F. A bead under load was depressed to an average of 0.015 inch thickness and had good resiliency when the load was removed.

Finally, the composite sealed shingle of (Sample a) passed the 60 mph wind test (ASTM D-3161), when the roof deck was sealed at 90° F.

One shingled roof was installed using the composition of Example 1 to seal the shingle courses, on a cold day (45° F.) and another shingled roof was similarly installed using the composition of Example 1 on a warm day (75° F.). In both instances, rider granule pickup was less than 10%. Also, the sticking between the bundled shingles was less than 1%. Both the roofs decks were sealed in 24 hours under the above conditions.

EXAMPLE 2

The following composition having an ACI of 0.214 and an asphaltene content of 15.88% was prepared

|  | Wt. % |
| --- | --- |
| Road asphalt AC-20 | 49 |
| Hard asphalt resin | 40 |
| Diblock styrene-butadiene | 5 |
| Triblock styrene-butadiene-styrene | 1 |
| Filler, limestone | 5 |

In this example, the rubber components were first dissolved in the road asphalt by mixing for 2 hours at 350° F. The hard asphalt and filler were then added under the same conditions and agitation was continued at 350° F. for an additional 1 hour.

The peel strength test described in Example 1 was repeated for this composition at oven temperatures of 75° F., 90° F. and 100° F. The results of these tests are reported in Table II.

TABLE II

| Shingle Temperature | Av. of 4 Specimens*<br>Peel Strength (lbs.) |
| --- | --- |
| 75° F. | 5.54 |
| 90° F. | 10.5 |
| 100° F. | 14.88 |

*the peel strength of the 4 specimens at each temperature varied not more than 10%

The squash resistance test of Example 1 was also repeated on the product of this example and was found to be greater than 60% based on the thickness of the beads.

EXAMPLE 3

The general procedure described in Example 1 was repeated to prepare the following composition.

|  | Wt. % |
| --- | --- |
| Road asphalt AC-20 | 64 |
| Triblock rubber | 6 |
| Filler, limestone | 30 |

The ACI of this composition was 0.192 and the asphaltene content was 12%.

The peel strength at 75° F. and 100° F. oven temperatures is as reported in Table III.

TABLE III

| Shingle Temperature | Peel Strength (lbs.) |
| --- | --- |
| 75° F. | 5.14 |
| 100° F. | 13.72 |

Squash resistance was greater than 50% for this sample.

EXAMPLE 4

(Comparative)

The procedure described in Example 1 using the same components, was employed to prepare the following composition

|  | Wt. % |
| --- | --- |
| Road asphalt AC-20 | 28 |
| Hard asphalt resin | 50 |
| Diblock rubber | 5 |
| Triblock rubber | 1 |
| Filler, limestone | 16 |

The ACI of this composition was 0.267 and the asphaltene content was 20.32% which is above the critical upper limits of the present invention. It was found that most of the rubber was not dissolved in the asphalt blend and a non-uniform composition resulted which showed increased tack and poor pour properties from the applicator. Incorporation of the rubber would have required the addition of extraneous aromatic oils to compensate for the high ACI.

The peel strength of the above composition at shingle temperatures of 75° F. and 90° F. was approximately 0.5 and 2.0 pounds respectively. Specimens of this material were found to have 90% squash under a 50 pound load for 16 hours at 100° F.

EXAMPLE 5

It was found that when the ACI of the bitumen blend is greater than 0.26, the oxidation of the asphalt components on outdoor exposure to UV light significantly accelerates deterioration of the cohesive properties. Thus, the product does not preform the desired self-sealing function, even at high temperatures.

A composition was made up of 70% hard asphalt resin and 30% filler; however, the rubber component could not be dissolved in this mixture and was therefore omitted.

The ACI of this composition was 0.30 and a sample of this composition was compared with a sample of the composition of Example 1. Both samples were subjected to outdoor exposure at 40° F. on a sunny day for 24 hours.

The degree of UV deterioration after exposure was determined by evaluation of the adhesive properties of these samples, as shown by the peel strength test. Since it was not possible to incorporate a rubber component in a composition having an ACI greater than 0.26 which automatically causes an increase above 20% of the asphaltene content, the present comparison limited to deterioration of only the hard resin asphalt component, particularly its aromatic fraction.

The % peel strength retention of the Example 1 composition at 135° F. was found to be 80% as compared to the % peel strength retention of the sample containing 70% hard asphalt resin which at 135° F. was only 10%.

EXAMPLE 6

The criticality of employing not more than 6% rubber in the total composition is illustrated below.

The following composition was prepared and tested in 4 replicate for peel strength according to the procedure of Example 2.

|  | Wt. % |
| --- | --- |
| Road Asphalt | 49 |
| Hard Asphalt | 40 |
| Diblock | 5 |
| Triblock | 2 |
| Filler, limestone | 4 |

The averaged results of the peel strength tests, performed in quadruplicate are as follows.

| Shingle Temperature | Peel Strength (lbs.) |
| --- | --- |
| 90° F. | 5.0 |
|  | 6.9 |
|  | 10.5 |
|  | 4.7 |

The considerable variation (up to 100%) in peel strengths is attributed to phase incompatablity of 7% rubber component in the bitumen component (ACI 0.214 and 15.88% asphaltene content).

EXAMPLE 7

(Comparative)

The following roofing adhesive blends were prepared using roofer's flux bitumen.

|  | Blend A | Blend B |
| --- | --- | --- |
| roofers flux bitumen (Indiana Farm) | 94.0% | 92.0% |
| styrene-butadiene-styrene triblock rubber | 6.0% | 8.0% |

Peel Tests in 4 replicate of blend A at 75° F.* and of blend B at 65° F.* were carried out. The results are as follows.

|  | Peel Strength (lbs.) | |
| --- | --- | --- |
|  | Blend A | Blend B |
|  | 5.7 | 0.0 |
|  | 3.2 | 1.2 |
|  | 3.8 | 2.2 |
|  | 4.6 | 2.5 |
| Average | 4.3 | 1.5 |
| Variablility | 78%** | 200%** |

*shingle temperature
**indicates incompatibility of rubber component

Both blends showed very high tack which caused rider granule pick up greater than 40% and shingle sticking when packed in bundles.

What is claimed is:

1. A bituminous adhesive blend consisting essentially of:
   (a) 50-95% by weight of a bituminous component comprising a road paving grade asphalt or a mixture of road paving grade asphalt and a hard resin asphalt in a weight ratio of between about 1:10 and about 10:1, said component having an ACI less than 0.26 and an asphaltene content less than 20%;
   (b) 1-6% by weight of a thermoplastic block copolymer of styrene and butadiene wherein the weight ratio of styrene to butadiene is between about 1:1 and about 1:10; and
   (c) 4-40% by weight of an inert filler.

2. The blend of claim 1 wherein the ACI of the bituminous component is at least about 0.20.

3. The blend of claim 1 wherein the bituminous component is a mixture and the weight ratio of road paving grade asphalt to hard resin asphalt is between about 1:2 and about 5:1.

4. The blend of claim 1 wherein the bituminous component is road paving grade asphalt having a needle penetration at 77° F. of 40-80.

5. The blend of claim 1 wherein the thermoplastic copolymer of styrene and butadiene consists essentially of between 0% and about 90% by weight of diblock copolymer having a Brookfield viscosity (25 wt. % toluene solution) at 77° F. of between about 500 and about 5,000 cps and between 100% and about 10% by weight of triblock copolymer having a Brookfield viscosity (25 wt. % toluene solution) at 77° F. of between about 1,000 and about 50,000 cps.

6. The blend of claim 5 wherein the thermoplastic triblock copolymer has a linear or branched structure.

7. The blend of claim 5 wherein the thermoplastic diblock copolymer has a linear structure and the styrene-butadiene-styrene triblock copolymer has a radial structure.

8. The blend of claim 1 wherein the filler is selected from the group of limestone and sand.

9. The blend of claim 1 wherein the bituminous component is a mixture and the hard resin asphalt is a propane cut petroleum asphalt having a softening point of between about 165° F. and about 195° F.

10. The process of producing the adhesive of claim 1 which comprises gradually adding component (b) to at least the road paving grade asphalt of component (a) at a temperature between about 250 and about 450° F. to dissolve component (b) in the asphalt of component (a) mixing to obtain uniformity of the mixture and adding component (c).

11. The process of claim 10 wherein the bituminous component is a mixture and is maintained at a temperature of between about 300° F. and about 400° F. and component (b) followed by component (c) is added to component (a) and mixed therein to provide a uniform composition.

12. The process of claim 10 wherein component (a) is a mixture and component (b) is mixed with the road paving grade asphalt of component (a) at a temperature of between about 250° F. and about 400° F. until a uniform composition is formed, the hard asphalt of component (a) is then added to the uniform composition with mixing at between about 300° F. and about 400° F. followed by component (c).

13. The blend of claim 1 having less than 10% filler which additionally contains between about 0.05% and about 5% by weight of a stearically hindered phenolic antioxidant.

14. The process of claim 10 wherein the adhesive contains less than 10% of filler and a stearically hindered phenolic antioxidant is added and mixed into the composition before the addition of filler.

* * * * *